US007092955B2

(12) United States Patent
Mah et al.

(10) Patent No.: US 7,092,955 B2
(45) Date of Patent: Aug. 15, 2006

(54) SCHEMA FOR SQL STATEMENTS

(75) Inventors: Ernest Wing Mah, Markham (CA); Christina P Lau, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 10/143,992

(22) Filed: May 10, 2002

(65) Prior Publication Data

US 2003/0037039 A1 Feb. 20, 2003

(30) Foreign Application Priority Data

Aug. 16, 2001 (CA) .................................. 2355418

(51) Int. Cl.
G06F 7/00 (2006.01)
G06F 9/44 (2006.01)

(52) U.S. Cl. .......................... 707/100; 707/101; 707/1; 717/116; 717/108

(58) Field of Classification Search .................... 707/3, 707/101–104.1, 103 R, 100, 10, 1; 711/170, 711/207; 717/108, 116
See application file for complete search history.

(56) References Cited

U.S. PATENT DOCUMENTS

| 5,241,648 | A | * | 8/1993 | Cheng et al. ................... 707/7 |
| 5,550,971 | A | | 8/1996 | Brunner et al. ............. 395/161 |
| 5,594,898 | A | * | 1/1997 | Dalal et al. ..................... 707/2 |
| 5,666,525 | A | * | 9/1997 | Ross .............................. 707/2 |
| 5,809,505 | A | * | 9/1998 | Lo et al. ...................... 707/102 |
| 5,819,251 | A | * | 10/1998 | Kremer et al. .................. 707/1 |
| 6,014,670 | A | | 1/2000 | Zamanian et al. .......... 707/101 |
| 6,018,627 | A | | 1/2000 | Iyengar et al. ............. 395/701 |
| 6,076,090 | A | * | 6/2000 | Burroughs et al. ......... 707/102 |
| 6,138,112 | A | * | 10/2000 | Slutz .............................. 707/2 |
| 6,192,371 | B1 | * | 2/2001 | Schultz .................... 707/103 R |
| 6,199,195 | B1 | | 3/2001 | Goodwin et al. ............... 717/1 |
| 6,226,649 | B1 | | 5/2001 | Bodamer et al. ........... 707/104 |
| 6,282,547 | B1 | * | 8/2001 | Hirsch ........................ 707/102 |
| 6,317,748 | B1 | * | 11/2001 | Menzies et al. ........ 707/103 X |
| 6,366,921 | B1 | | 4/2002 | Hansen et al. .......... 707/103 R |
| 6,374,252 | B1 | * | 4/2002 | Althoff et al. .............. 707/102 |
| 6,502,102 | B1 | * | 12/2002 | Haswell et al. ............. 707/102 |
| 6,574,639 | B1 | * | 6/2003 | Carey et al. ............. 707/104.1 |
| 6,581,052 | B1 | * | 6/2003 | Slutz .............................. 707/2 |
| 6,629,094 | B1 | * | 9/2003 | Colby et al. ............ 707/103 R |
| 6,631,519 | B1 | * | 10/2003 | Nicholson et al. .......... 707/102 |
| 6,662,188 | B1 | * | 12/2003 | Rasmussen et al. ........ 707/102 |
| 6,681,383 | B1 | * | 1/2004 | Pastor et al. ................. 717/126 |
| 6,704,747 | B1 | * | 3/2004 | Fong ....................... 707/104.1 |
| 6,810,400 | B1 | * | 10/2004 | Kagalwala et al. ......... 707/100 |
| 6,944,614 | B1 | * | 9/2005 | Ramasamy et al. ............ 707/4 |

(Continued)

OTHER PUBLICATIONS

Jay Banerjee, Hong-Tai Chou, Jorge F. Garza, Won Kim, Darrell Woelk, Nat Bailou and Hyoung-Joo Kim, "Data Model Issues for Object-Oriented Applications"—ACM Transactions on Information Systems (TOIS), vol. 5, Issue 1 Jan. 1987 (pp. 3-26).*

(Continued)

*Primary Examiner*—Jean M. Corrielus
*Assistant Examiner*—Anh Ly
(74) *Attorney, Agent, or Firm*—John L. Rogitz

(57) ABSTRACT

A schema is provided for Structured Query Language statements. Advantageously, through the use of this schema as a common model, different tools can be implemented to provide value-add functions on top of the common model. This invention allows tools that are interested in querying meta data to work off a higher abstraction model than is the norm.

18 Claims, 15 Drawing Sheets

U.S. PATENT DOCUMENTS

| | | | |
|---|---|---|---|
| 2002/0023261 A1* | 2/2002 | Goodwin et al. | 717/146 |
| 2002/0059280 A1* | 5/2002 | Slesinsky | 707/100 |
| 2002/0059566 A1* | 5/2002 | Delcambre et al. | 717/146 |
| 2002/0103869 A1* | 8/2002 | Goatly et al. | 707/513 |
| 2002/0116385 A1* | 8/2002 | Kagalwala et al. | 707/100 |
| 2002/0138819 A1* | 9/2002 | Hills | 717/114 |
| 2002/0169745 A1* | 11/2002 | Hotti et al. | 707/1 |
| 2003/0028511 A1* | 2/2003 | Sluiman | 707/1 |
| 2003/0033277 A1* | 2/2003 | Bahulkar et al. | 707/1 |
| 2003/0055948 A1* | 3/2003 | Wang | 709/224 |
| 2003/0120628 A1* | 6/2003 | Salo et al. | 707/1 |
| 2003/0163479 A1* | 8/2003 | Mathews et al. | 707/102 |
| 2005/0005264 A1* | 1/2005 | Gurevich et al. | 717/116 |
| 2005/0027725 A1* | 2/2005 | Kagalwala et al. | 707/100 |
| 2005/0060332 A1* | 3/2005 | Bernstein et al. | 707/100 |
| 2005/0076044 A1* | 4/2005 | Kagalwala et al. | 707/100 |

OTHER PUBLICATIONS

<<UML>>' 99—The Unified Modeling Language—Beyond the Standard—Robert France & Bernhard Rumpe—2nd Internationa Conference, Oct. 28-30, 1999 proceedins (pp. 599-613).*

France et al.—"<<UML>>'99—The Unified Modeling Language—Beyond the Standard"—Sringer—Second International Conference, Oct. 28-30, 1999 proceedings (pp. 599-613).*

"Universal Code Genrator Based on Templates and Design Models", Research Disclosure, Oct., 1997, article 42668, p. 1357.

"Verification of test scripts using XML DTDs", Research Disclosure, v.44, No. 443, Mar. 2001, article 443127, p. 466.

"TOPLink bridges the gap between the world of objects an world of relational technology". TOPLink for Java internet publication. http://www.objectpeople.com/toplink/java/features.htm. pp. 1-3. Apr. 3, 2000.

PUBLICATION: "Using UML/OCL Constraints for Relational Database Design". UML '99- The Unified Modeling Language. Demuth et al. Proceedings from the Second International Conference. pp. 599-613. Oct. 28-30, 1999.

* cited by examiner

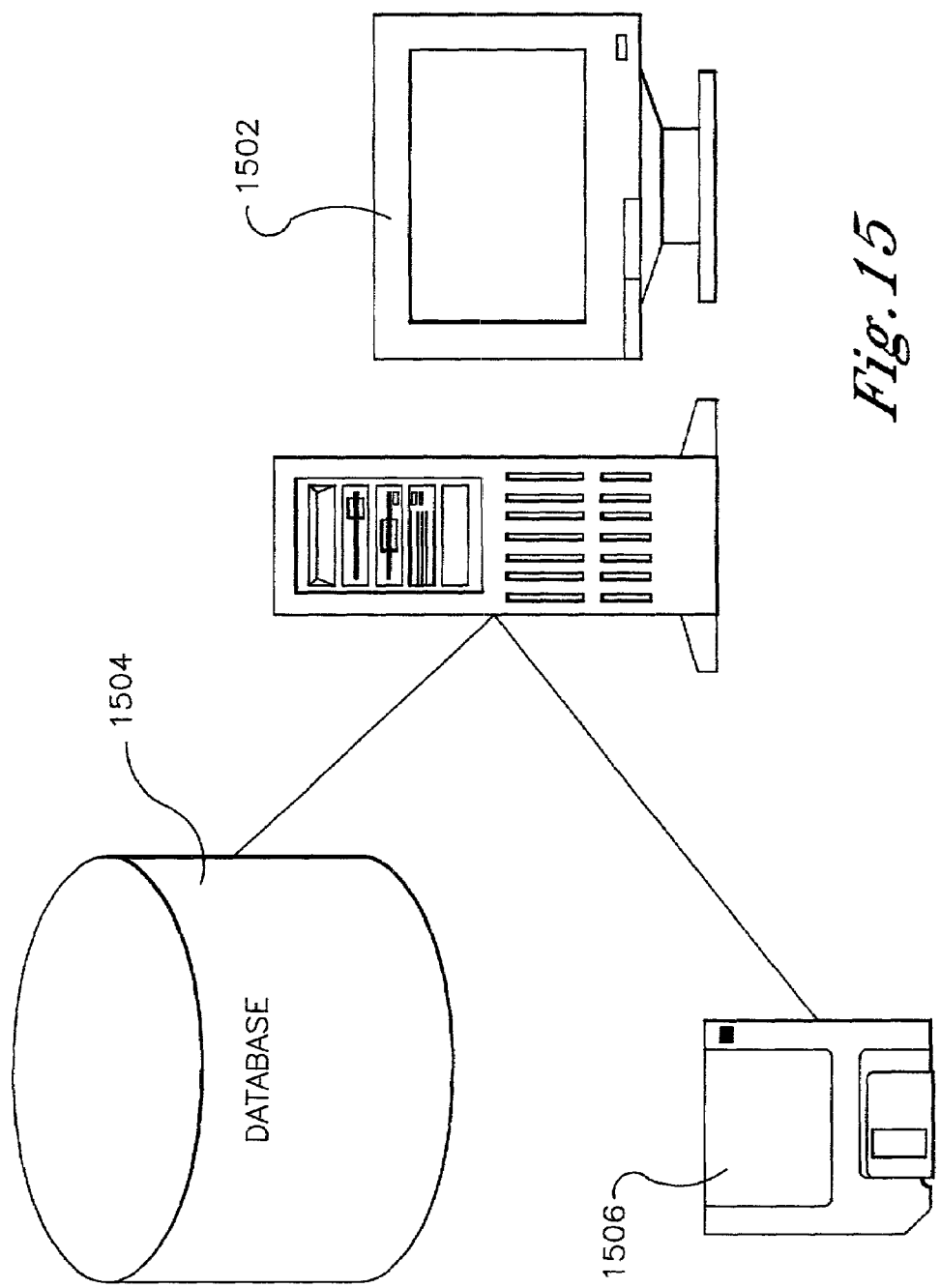

SCHEMA FOR SQL STATEMENTS

FIELD OF THE INVENTION

The present invention relates to manipulation of relational databases and, in particular, to a schema for Structured Query Language (SQL) statements.

BACKGROUND OF THE INVENTION

Data collection is ever increasing in a world wherein more and more transactions occur electronically. Indeed, certain applications, such as data mining, that are made more useful by the combination of increasing processor power and increasing availability of data, tend to inspire further data collection. This inspiration to further data collection may be seen, for instance, in the proliferation of customer reward programs. In response to this increasing availability of data, industries have been built up over recent decades around database technology. Specifically, active members of these industries include database vendors, who sell databases either individually or collectively (in a catalog), and tool vendors, who sell software that is required to create a new database or alter, or query, existing databases.

The Structured Query Language (SQL) is a standard interactive and programming language for retrieving information from, writing information to and updating a database. Fundamentally, a set of data may be considered to be stored in one or more tables, where each table is made up of columns. When a request (or "query") is made to retrieve data from these tables, the resultant output is often also presented in a table form. There are many different versions of the SQL, but to be in compliance with the ANSI SQL '92 Standard, they all must use and support statements, made up of the same major keywords (such as SELECT, UPDATE, DELETE, INSERT, WHERE, and others), in a similar manner. For further information about SQL, see "ISO Final Draft International Standard (FDIS)—Database Language SQL—Part 2: Foundation (SQL/Foundation)", March 1999, which is incorporated herein by reference and referenced hereinafter as "the SQL specification".

Although the SQL has a standardized format for these statements, today, all database engines have an internal representation of these statements that is not necessarily exposed to the outside world. As such, each tool for manipulating a particular implementation of a database requires a proprietary means to translate standard SQL statements into an internal representation specific to that database.

SUMMARY OF THE INVENTION

A schema for SQL statements provides a level of abstraction between a tool for manipulating data in a database and the database itself. Tool vendors may then provide value-add functions on top of this schema. Advantageously, the tool vendors need not be aware of the internal representation of SQL statements used to manipulate particular databases.

In accordance with an aspect of the present invention there is provided a schema for Structured Query Language (SQL) statements. The schema includes an abstract class for describing an SQL expression, the abstract class including a property for indicating a parameter marker name for the SQL expression and a property for indicating whether an expression representing a result column is to be displayed as part of a result table.

In accordance with another aspect of the present invention there is provided an object-oriented description of a Structured Query Language (SQL) statement. The object-oriented description includes an instance of a class derived from an abstract class for describing an SQL expression, the abstract class including a property for indicating a parameter marker name for the SQL expression and a property for indicating whether an expression representing a result column is to be displayed as part of a result table.

In accordance with a further aspect of the present invention there is provided an object-oriented programming language implementation of a schema for Structured Query Language (SQL) statements, where the schema includes an abstract class for describing an SQL expression, the abstract class including a property for indicating a parameter marker name for the SQL expression and a property for indicating whether an expression representing a result column is to be displayed as part of a result table.

In accordance with a still further aspect of the present invention there is provided a schema for Structured Query Language (SQL) statements. The schema includes a first abstract class for describing content of an SQL FROM clause and a second abstract class for describing a join between at least two tables, where the second abstract class is derived from the first abstract class and the second abstract class includes a property for indicating a type for the join.

In accordance with an even further aspect of the present invention there is provided an object-oriented description of a Structured Query Language statement. The object-oriented description includes a first abstract class for describing content of an SQL FROM clause and a second abstract class for describing a join between at least two tables, where the second abstract class is derived from the first abstract class and the second abstract class includes a property for indicating a type for the join.

In accordance with another aspect of the present invention there is provided an object-oriented programming language implementation of a schema for Structured Query Language (SQL) statements, where the schema includes a first abstract class for describing content of an SQL FROM clause and a second abstract class for describing a join between at least two tables, and where the second abstract class is derived from the first abstract class and the second abstract class includes a property for indicating a type for the join.

In accordance with still another aspect of the present invention there is provided a method of generating a representation of a Structured Query Language (SQL) statement. The method includes receiving input from a user, the input specifying a SQL statement and a database upon which the SQL statement is to act, responsive to the receiving the input, creating a representation of the SQL statement, where the creating includes instantiating an object of a class derived from an abstract class for describing an SQL expression, the abstract class including a property for indicating a parameter marker name for the SQL expression and a property for indicating whether an expression representing a result column is to be displayed as part of a result table. The method further includes storing the representation of the SQL statement. In a still further aspect of the present invention, there is provided a software medium that permits a general purpose computer to carry out this method.

In accordance with an even further aspect of the present invention there is provided a method of modifying a representation of a Structured Query Language (SQL) statement. The method includes reading a file containing a representation of an SQL statement and parsing the representation to conform with a schema for SQL statements. In a still further aspect of the present invention, there is provided a software medium that permits a general purpose computer to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 15 illustrates a computer system, in communication with a database, for using the UML schema that is an embodiment of the present invention.

The figures illustrate a UML schema using the standard nomenclature for UML as set out in, for example, Grady Booch, Ivar Jacobson, James Rumbaugh, "The Unified Modeling Language User Guide", Addison-Wesley, 1999, the contents of which are incorporated herein by reference.

DETAILED DESCRIPTION

An SQL statement typically has the following structure:
STATEMENT-NAME argument(s)
CLAUSE-NAME argument(s)
[OPTIONAL-CLAUSE-NAME argument(s)].

Often, the result of the execution of an SQL statement may be expressed in what is called a "result table". Even though the result is called a "result table", the actual result may be a single value, a column of values or, as the name suggests, a table of values.

The following will often illustrate an exemplary structure of a particular SQL statement. The exemplary structure is, by no means, intended to be exhaustive. As those familiar with the SQL will understand, certain SQL statements may have extensive possible representations. For exhaustive coverage of these possible representations, the SQL specification should be consulted.

Figure 1:
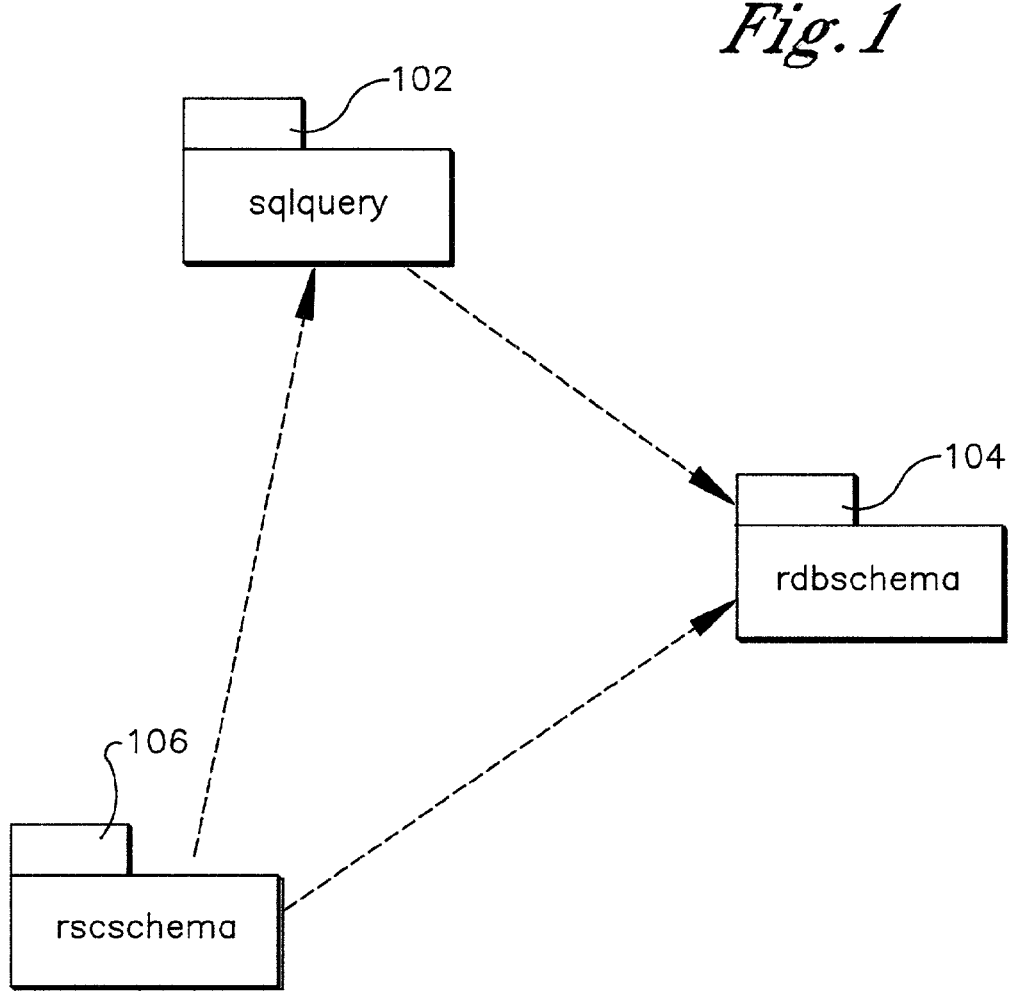
FIG. 1 illustrates a class diagram including a package that is an embodiment of the present invention and other, related, packages.

FIG. 1 illustrates a class diagram indicating dependencies between different schemas. In particular, a Unified Modeling Language (UML) schema called sqlschema 102, which is an embodiment of the present invention, has a dependency on a UML schema called rdbschema 104, which was described in U.S. patent application Ser. No. 09/998,704 filed on Nov. 30, 2001 (hereby incorporated herein by reference). Furthermore, a UML schema called rscschema 106 has a dependency on both the UML schema called rdbschema 104 and the UML schema called sqlschema 102.

Figure 2:
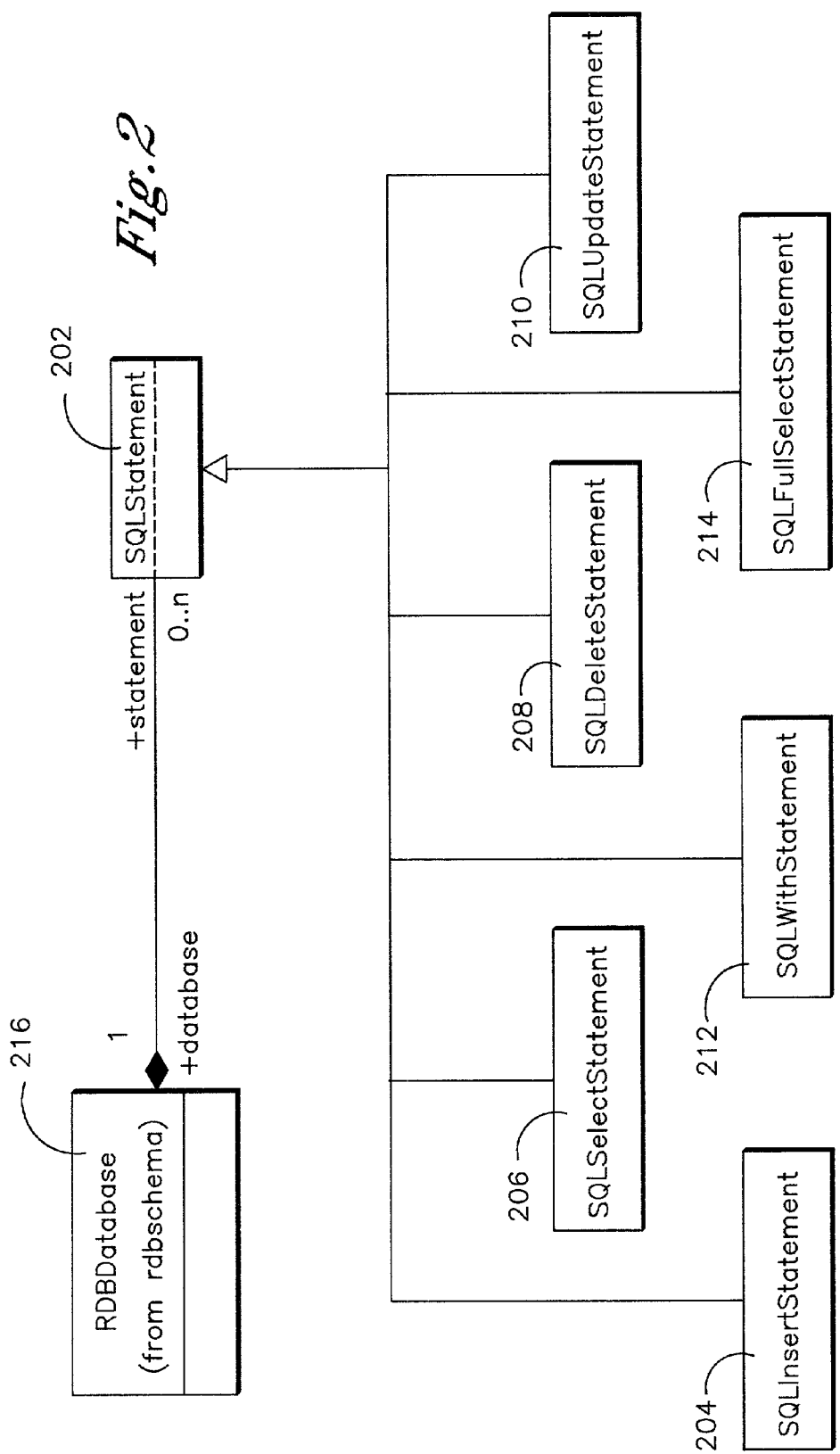
FIG. 2 illustrates a class diagram, of the UML schema for SQL statements that is an embodiment of the present invention, including an abstract class SQLStatement.

As shown in the class diagram of FIG. 2, a class RDB-Database 216 owns an abstract class SQLStatement 202. By the multiplicity statements (generally found at ends of the lines showing associations between classes) associated with the relationship between the class RDBDatabase 216 and the abstract class SQLStatement 202, it can be seen that instances of classes that are derived from the abstract class SQLStatement 202 refer to a single instance of the class RDBDatabase and that a multiplicity of such instances may be used. Many classes are derived from (i.e., extend) the abstract class SQLStatement 202, including a class SQLInsertStatement 204, a class SQLSelectStatement 206, a class SQLDeleteStatement 208, a class SQLUpdateStatement 210, a class SQLWithStatement 212 and a class SQLFullSelectStatement 214. The classes derived from the abstract class SQLStatement 202 are described hereinafter.

In the SQL, an INSERT statement is used to place values in particular fields of particular tables. An INSERT statement is defined by the class SQLInsertStatement 204. A typical INSERT statement will appear as follows:
INSERT
INTO table-name (column1, column2, . . . )
VALUES value1, value2, . . .
[WITH expression FULLSELECT values-clause]

Figure 3:
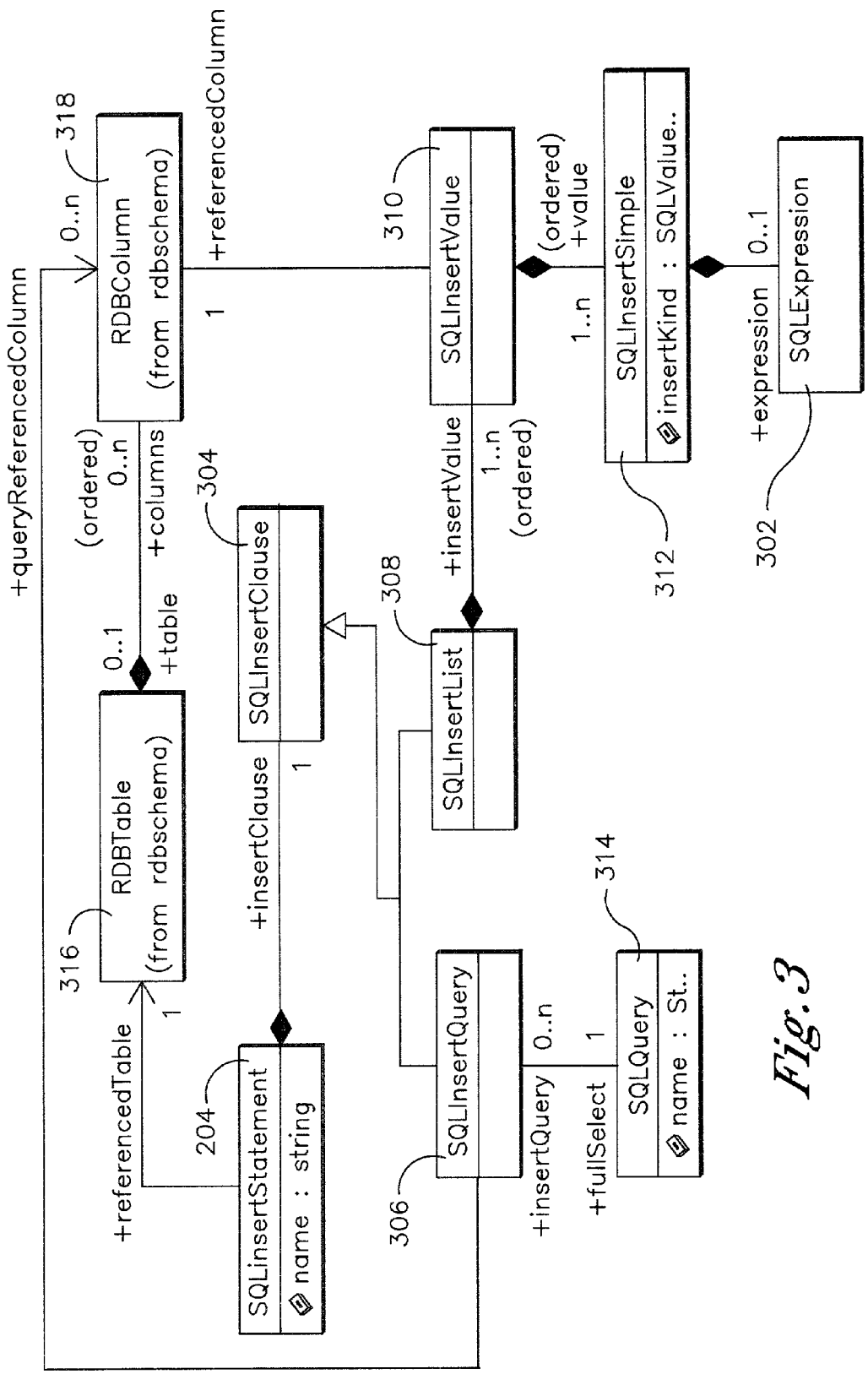
FIG. 3 illustrates a class diagram, of the UML schema for SQL statements that is an embodiment of the present invention, including a class SQL InsertStatement.

The class diagram of FIG. 3 includes the class SQLInsertStatement 204. The class SQLInsertStatement 204 includes a string-type property "name" and owns an abstract class SQLInsertClause 304. A class SQLInsertQuery 306 and a class SQLInsertList 308 are both derived from the abstract class SQLInsertClause 304. The class SQLInsertQuery 306 references an abstract class SQLQuery 314 while the class SQLInsertList 308 owns a class SQLInsertValue 310. The class SQLInsertValue 310 owns a class SQLInsertSimple 312, which, in turn, owns an abstract class SQLExpression 302. Two classes from the UML schema called rdbschema 104 (FIG. 1) are incorporated into FIG. 3, namely, a class RDBTable 316 and a class RDBColumn 318. The class RDBTable 316 is referenced by the class SQLInsertStatement 204 and owns the class RDBColumn 318 while the class RDBColumn 318 is referenced by the class SQLInsertValue 310 and the class SQLInsertQuery 306. Each of the class SQLInsertStatement 204 and the abstract class SQLQuery 314 has a string-type property called "name". As well, the class SQLInsertSimple 312 has a property called "insertKind" of type SQLValueKind. The property "insertKind" may be used to indicate whether the value to be inserted is an expression, a null or a default value as indicated in the table definition.

In the SQL, a SELECT statement is used to extract values from particular fields of particular tables. A SELECT statement is defined by the class SQLSelectStatement 206.

A typical SELECT statement will appear as follows:
SELECT column-list
FROM table-name-list
[WHERE search-condition]
[GROUP BY column-list]
[HAVING function-statement]
[ORDER BY column-list]
[WITH expression FULLSELECT values-clause]

Figure 4:
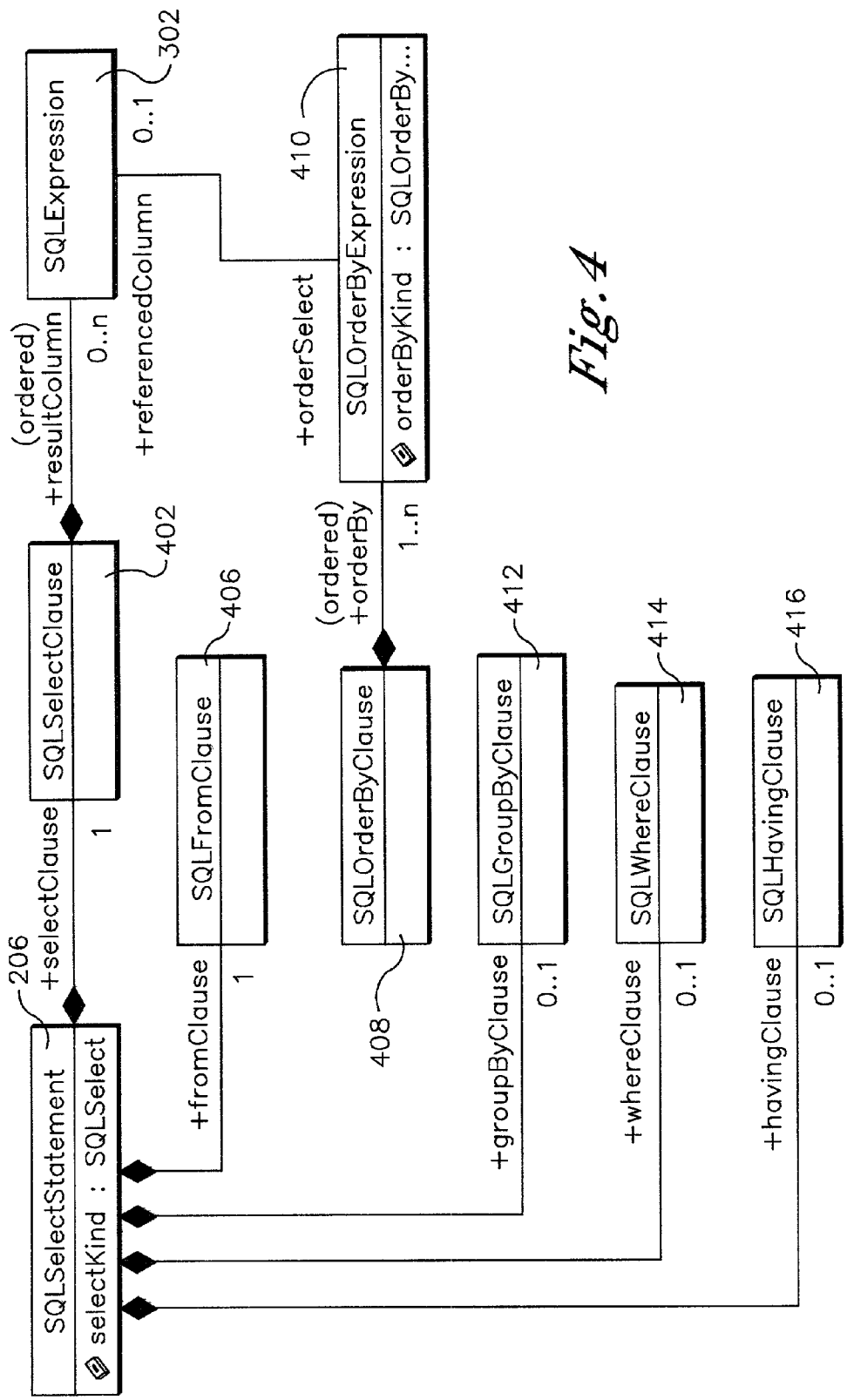
FIG. 4 illustrates a class diagram, of the UML schema for SQL statements that is an embodiment of the present invention, including a class SQLSelectStatement.

The class diagram of FIG. 4 includes the class SQLSelectStatement 206. The class SQLSelectStatement 206 owns many of the classes illustrated in FIG. 4. In particular, the class SQLSelectStatement 206 owns a class SQLSelectClause 402, a class SQLFromClause 406, a class SQLGroupByClause 412, a class SQLWhereClause 414 and a class SQLHavingClause 416. The class SQLSelectClause 402 owns the abstract class SQLExpression 302, which class references a class SQLOrderByExpression 410, which class is owned by a class SQLOrderByClause 408. The abstract class SQLExpression 302 plays a role for the class SQLSelectClause 402 that is given the role name "resultColumn". Similarly, the class SQLSelectClause 402 plays a role for the class SQLSelectStatement 206 that is given the role name "selectClause". The class SQLSelectStatement 206 has a property called "selectKind" of type SQLSelectKind. The property "selectKind" may be used to indicate whether the SELECT statement, which is an instance of the class SQLSelectStatement 206, is performing a "SELECT DISTINCT" or just a regular "SELECT" (i.e., SELECT all). Additionally, the class SQLOrderByExpression 410 has a property called "orderByKind" of type SQLOrderByKind. The consequence of forming an object of the class SQLSelectStatement 206 will be zero or more result columns. The property "orderByKind" may be used to indicate whether the order for an expression representing the result column is ascending or descending.

Figure 5:
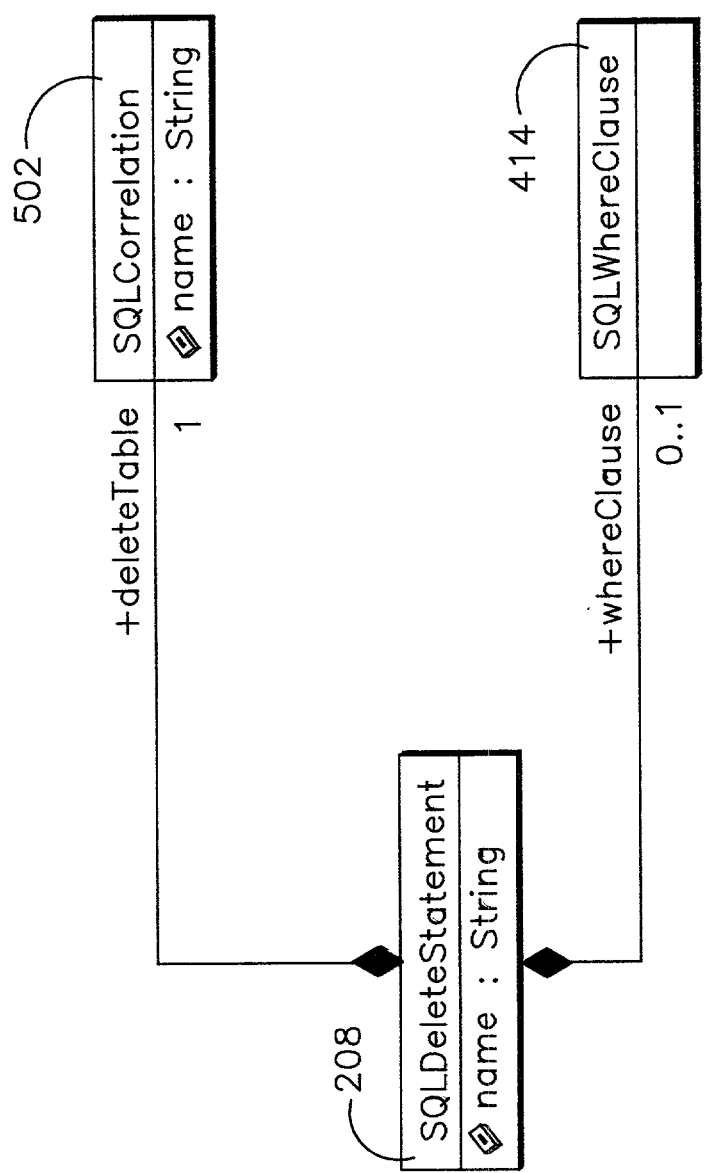
FIG. 5 illustrates a class diagram, of the UML schema for SQL statements that is an embodiment of the present invention, including a class SQLDeleteStatement.

In the SQL, a DELETE statement is used to remove particular rows of a particular table. A DELETE statement is defined by the class SQLDeleteStatement 208. A typical DELETE statement will appear as follows:
DELETE
FROM table-name
WHERE search-condition As shown in FIG. 5, the class SQLDeleteStatement 208 owns both a class SQLCorrelation 502 and the class SQLWhereClause 414. It may be noted that each of the class SQLDeleteStatement 208 and the class SQLCorrelation 502 has a string-type property called "name".

Figure 6:
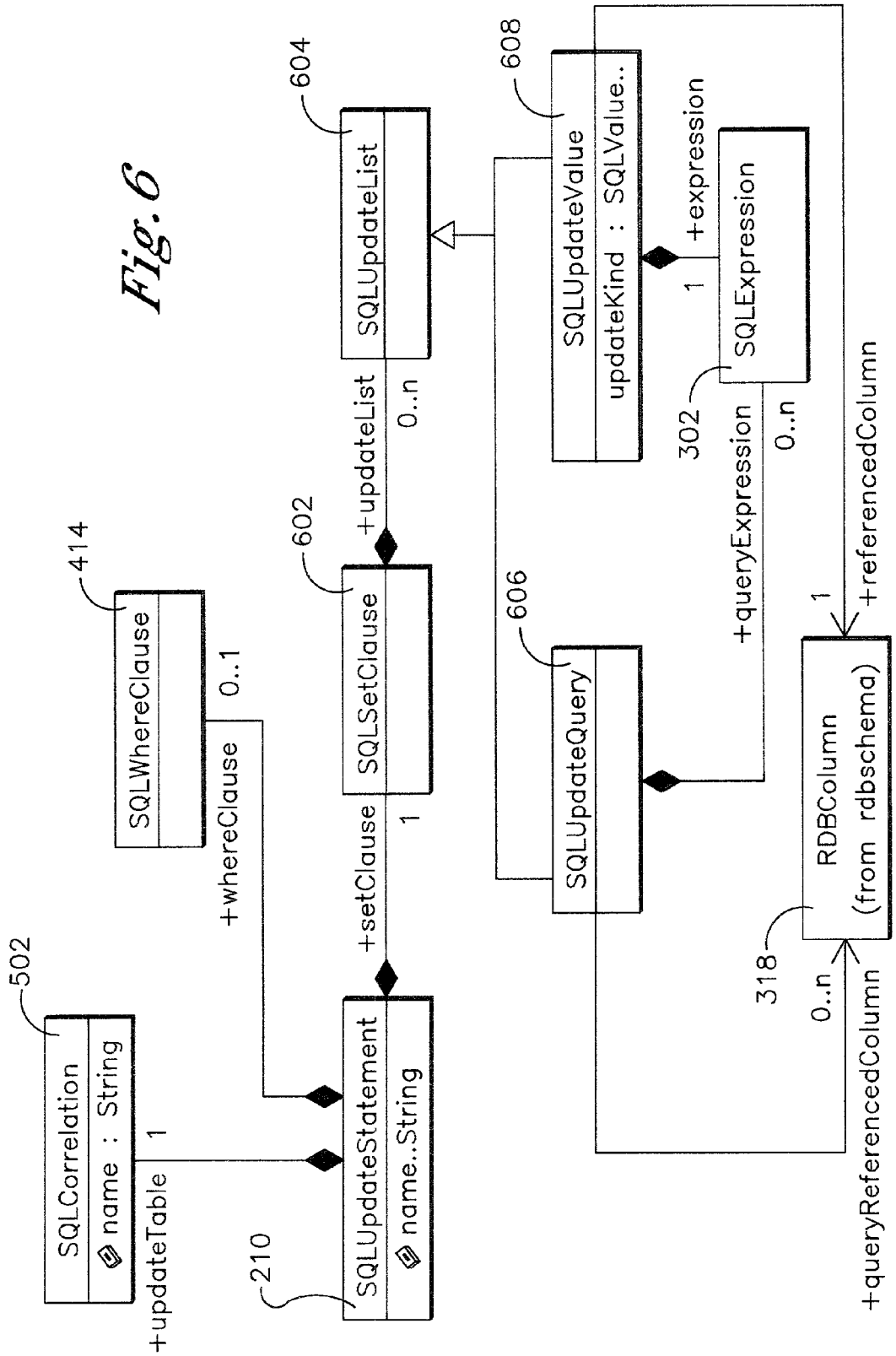
FIG. 6 illustrates a class diagram, of the UML schema for SQL statements that is an embodiment of the present invention, including a class SQLUpdateStatement.

In the SQL, an UPDATE statement is used to update values of particular columns of particular rows in of a particular table. An UPDATE statement is defined by the class SQLUpdateStatement 210. A typical UPDATE statement will appear as follows:
UPDATE table-name
SET column-name=new-value
WHERE search-condition From FIG. 6, the class SQLUpdateStatement 210 can be seen to own the class SQLCorrelation 502, the class SQLWhereClause 414 and a class SQLSetClause 602. Furthermore, the class SQLSetClause 602 owns an abstract class SQLUpdateList 604. A class SQLUpdateQuery 606 and a class SQLUpdateValue 608 have in common that they are derived from the abstract class SQLUpdateList 604. These two classes also have in common that they own the abstract class SQLExpression 302 and reference the class RDBColumn 318. The class SQLUpdateStatement 210 has a string-type property called "name". The class SQLUpdateValue 608 has a property called "updateKind" of type SQLUpdateKind. The property "updateKind" may be used to indicate whether the value to be updated is an expression, a null, or the default value in the table definition.

Figure 7:
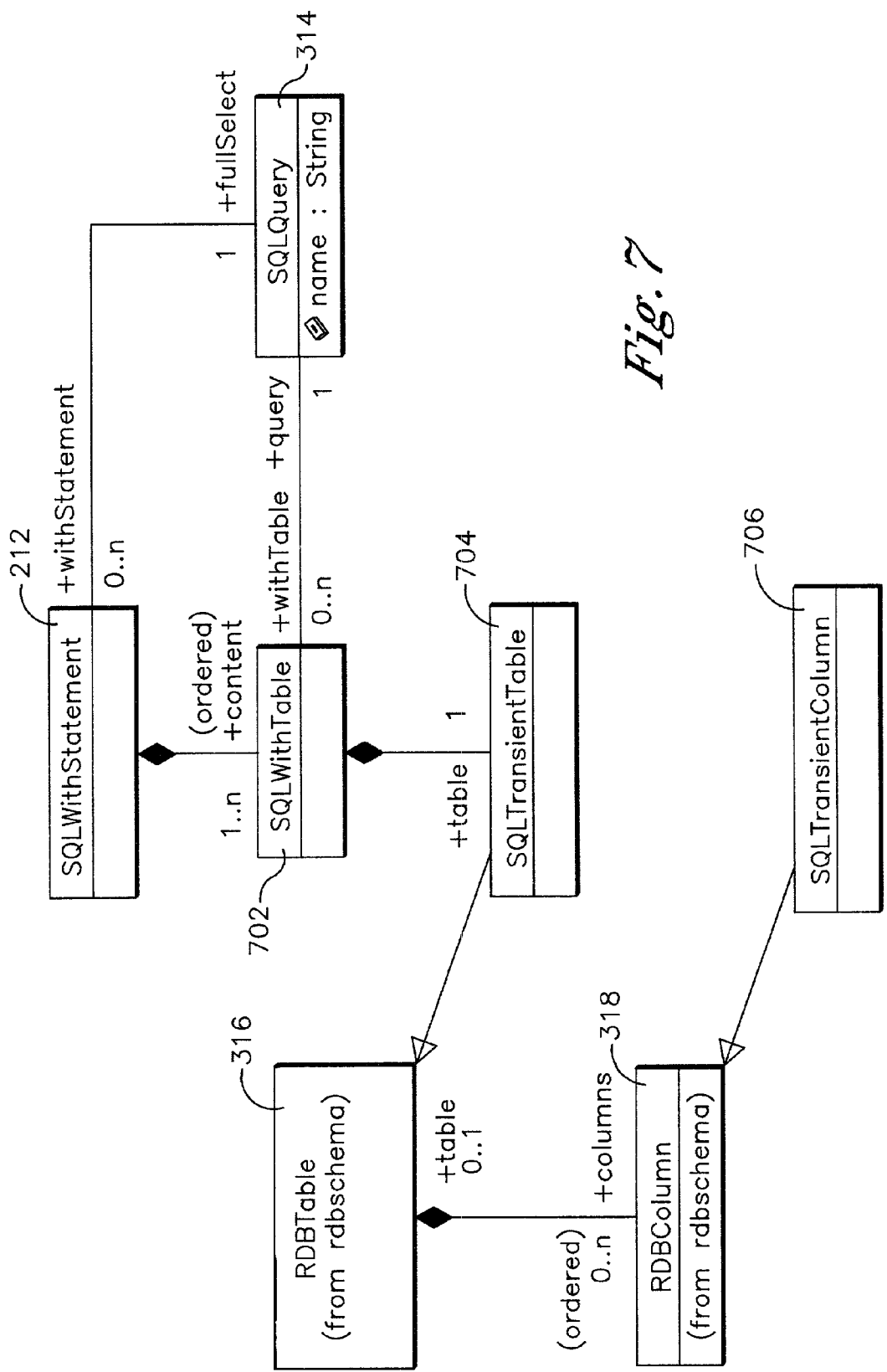
FIG. 7 illustrates a class diagram, of the UML schema for SQL statements that is an embodiment of the present invention, including a class SQLWithStatement.

In the SQL, a WITH statement is used to define an expression for use with FULLSELECT statement that follows. The WITH statement, which is defined by the class SQLWithStatement 212, may be used as part of a SELECT statement or an INSERT statement, where typical syntax of a WITH statement may be seen above. The class SQLWithStatement 212, a class diagram relating to which is shown in FIG. 7, references the abstract class SQLQuery 314 and owns a class SQLWithTable 702, which class also references the abstract class SQLQuery 314. The class SQLWithTable 702 owns a class SQLTransientTable 704 that is derived from the class RDBTable 316. The class RDBTable 316 owns the class RDBColumn while a class SQLTransientColumn 706 is derived from the class RDBColumn 318.

Figure 8:
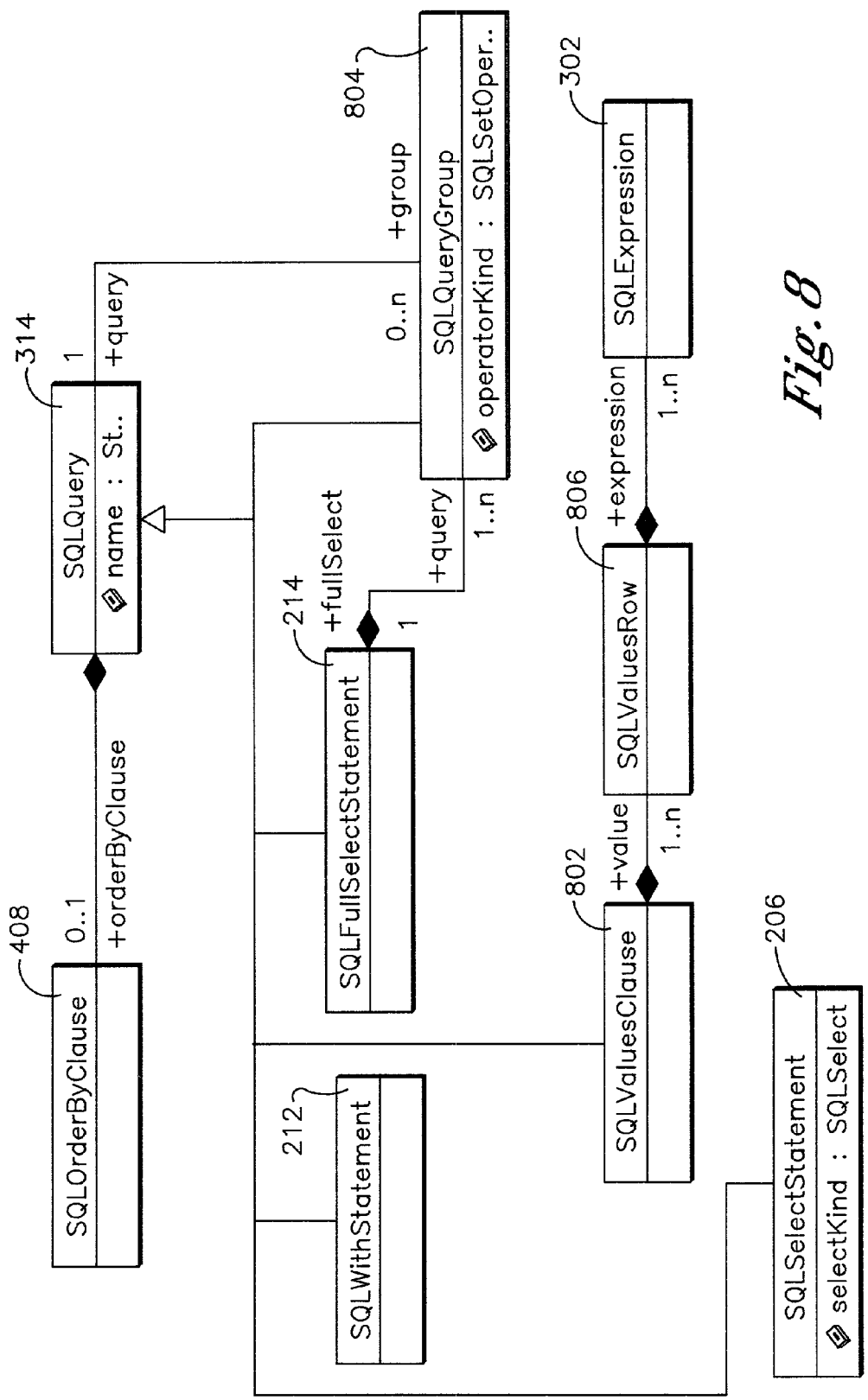
FIG. 8 illustrates a class diagram, of the UML schema for SQL statements that is an embodiment of the present invention, including a class SQLFullSelectStatement.

As seen above, a FULLSELECT statement may be a component of a SELECT statement or an INSERT statement, among others. A FULLSELECT statement, which is defined by the class SQLFullSelectStatement 214, specifies a result table. As may be understood through a review of FIG. 8, the class SQLFullSelectStatement 214, along with the class SQLSelectStatement 206 and the class SQLWithStatement 212, is derived from the abstract class SQLQuery 314. The class SQLFullSelectStatement 214 owns a class SQLQueryGroup 804. The class SQLQueryGroup 804 is also derived from the abstract class SQLQuery 314, references the abstract class SQLQuery 314 and, furthermore, has a property called "operatorKind" of type SQLOperatorKind. The property "operatorkind" may be used to indicate whether an operator to be used between two criteria is an "AND", an "OR" or a "NOT". Additionally, a class SQLValuesClause 802 is derived from the abstract class SQLQuery 314 and owns a class SQLValuesRow 806. The class SQLValuesRow 806 owns the abstract class SQLExpression 302. The abstract class SQLQuery 314, from which so many of the classes in FIG. 8 are derived, owns the class SQLOrderByClause 408.

Figure 9:
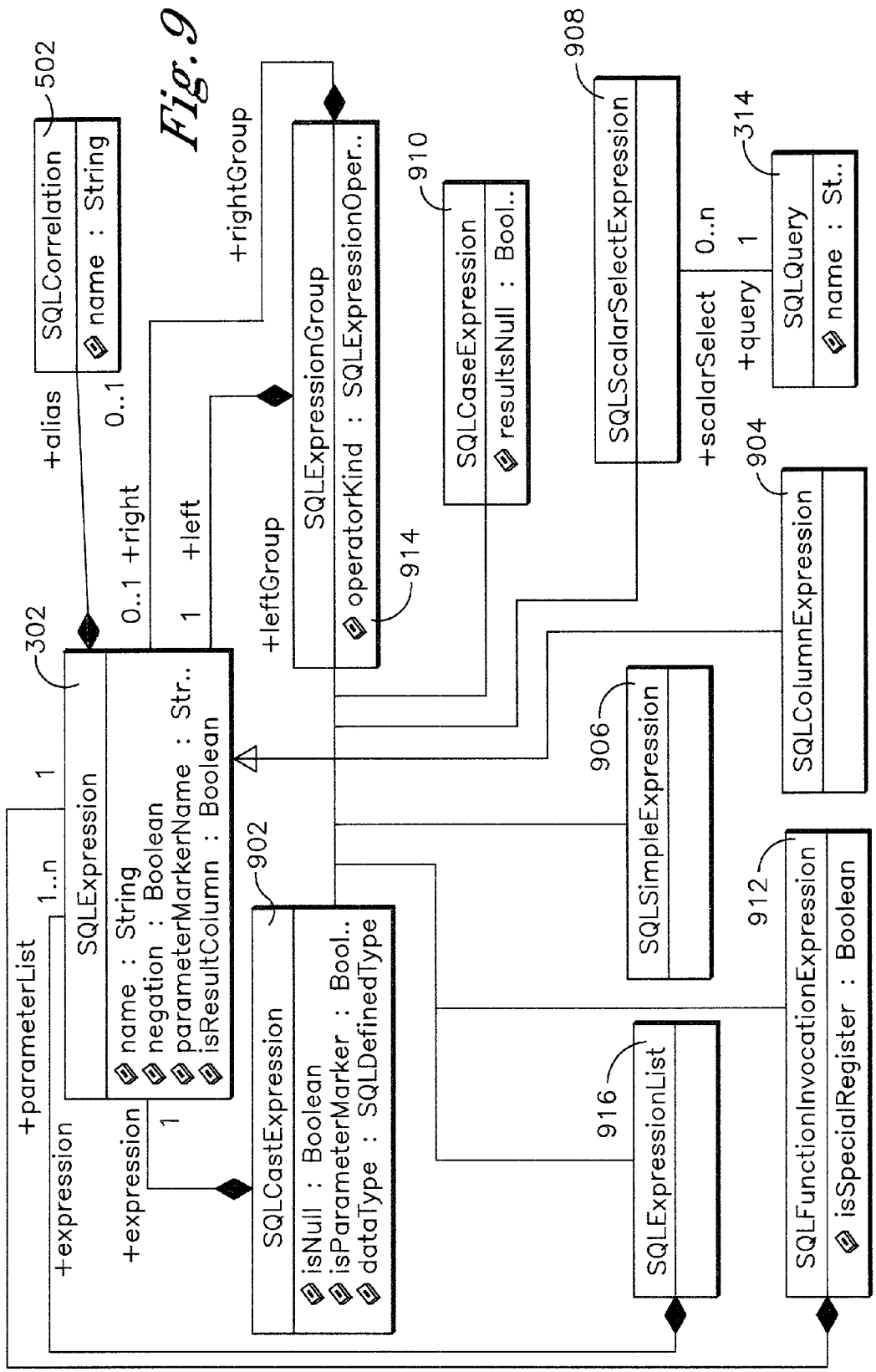
FIG. 9 illustrates a class diagram, of the UML schema for SQL statements that is an embodiment of the present invention, including a class SQLExpression.

FIG. 9 illustrates the variety of classes that are derived from the abstract class SQLExpression 302. These classes include a class SQLCastExpression 902, a class SQLColumnExpression 904, a class SQLSimpleExpression 906, a class SQLScalarSelectExpression 908, an abstract class SQLCaseExpression 910, a class SQLFunctionInvocationExpression 912, a class SQLExpressionGroup 914 and a class SQLExpressionList 916.

A "Case" expression, defined by the abstract class SQLCaseExpression 910, is a type of expression that can be used in most places where an expression is needed in the syntax of the various SQL statements and clauses described herein. The "Case" expression allows an expression to be selected based on the evaluation of one or more conditions.

A "Column" expression, defined by the class SQLColumnExpression 904, is a specific type of SQL expression that simply means an expression that refers to a column in a table. In the following exemplary SELECT statement, a column expression would be required to represent salary:

SELECT salary
FROM EMPLOYEE

If the statement was instead

SELECT AVG(salary)
FROM EMPLOYEE then a "Function Invocation" expression, defined by the class SQLFunctionInvocationExpression 912, would be required to represent the average AVG.

A "Cast" expression, defined by the class SQLCastExpression 902, returns the cast operand (the first operand) cast to the type specified by the data type. If the cast operand is an expression (other than a parameter marker or a NULL), the result is the argument value converted to a specified target data type.

An expression group, defined by the class SQLExpressionGroup 914, is an expression used in defining constructs such as:

(SALARY+5)/2

In this case, "(SALARY+5)" may be one object of the class SQLExpressionGroup 914. Further, "RESULT/2", where "RESULT" is the result of (SALARY+5) may be another object of the class SQLExpressionGroup 914. Objects of the class SQLExpressionGroup 914 may also used in places where a parameter may be specified.

A grouping-expression-list, defined by the class SQLExpressionList 916, is used within a CUBE or ROLLUP clause to define the elements in the CUBE or ROLLUP operation.

A "Scalar Select" expression, defined by the class SQLScalarSelectExpression 908, is a wrapper for an object of the abstract class object SQLQuery 314 so that the result of a query can be used in places where an expression is required.

A "Simple" expression, defined by the class SQLSimpleExpression 906, is just as it sounds. A "Simple" expression may be used to represent decimal numbers, hexadecimal numbers, strings, host variable names, etc.

The abstract class SQLExpression 302 has several properties including two string-type properties, called "name" and "parameterMarkerName", and a Boolean property, called "isResultColumn". The "name" property may be used to identify the expression while the "parameterMarkerName" may be used to identify a parameter marker. By way of explanation, an expression may include parameter markers, which can be replaced by the values of host variables when the SQL statement is executed. As will be apparent to a person skilled in the art, the term "parameter marker" relates to a question mark ("?") that is declared where a variable could be stated if the statement string were a static SQL statement. The value of the Boolean property "isResultColumn" indicates A "Cast" expression, defined by the class SQLCastExpression 902, returns the cast operand (the first operand) cast to the type specified by the data type. If the cast operand is an expression (other than a parameter marker or a NULL), the result is the argument value converted to a specified target data type.

An expression group, defined by the class SQLExpressionGroup 914, is an expression used in defining constructs such as:

(SALARY+5)/2

In this case, "(SALARY+5)" may be one object of the class SQLExpressionGroup 914. Further, "RESULT/2", where "RESULT" is the result of (SALARY+5) may be another object of the class SQLExpressionGroup 914. Objects of the class SQLExpressionGroup 914 may also used in places where a parameter may be specified.

A grouping-expression-list, defined by the class SQLExpressionList 916, is used within a CUBE or ROLLUP clause to define the elements in the CUBE or ROLLUP operation.

A "Scalar Select" expression, defined by the class SQLScalarSelectExpression 908, is a wrapper for an object of the abstract class object SQLQuery 314 so that the result of a query can be used in places where an expression is required.

A "Simple" expression, defined by the class SQLSimpleExpression 906, is just as it sounds. A "Simple" expression may be used to represent decimal numbers, hexadecimal numbers, strings, host variable names, etc.

The abstract class SQLExpression 302 has several properties including two string-type properties, called "name" and "parameterMarkerName", and a Boolean property, called "isResultColumn". The "name" property may be used to identify the expression while the "parameterMarkerName" may be used to identify a parameter marker. By way of explanation, an expression may include parameter markers, which can be replaced by the values of host variables when the SQL statement is executed. As will be apparent to a person skilled in the art, the term "parameter marker" relates to a question mark ("?") that is declared where a variable could be stated if the statement string were a static SQL statement. The value of the Boolean property "isResultColumn" indicates whether an expression representing a result column is to be displayed as part of a result table.

The class SQLScalarSelectExpression 908 references the abstract class SQLQuery 314. The class SQLCorrelation 502 is owned by the abstract class SQLExpression 302, which is owned by the class SQLCastExpression 902, the class SQLFunctionInvocationExpression 912, the class SQLExpressionGroup 914 and the class SQLExpressionList 916. The class SQLCastExpression 902 has two Boolean properties, namely "isNull" and "isParameterMarker", and one property of type SQLDefinedType, called "dataType". The property "isNull" may be used to indicate whether a cast expression, which is an instance of the class SQLCastExpression 902, is attempting to cast to NULL. The property "isParameterMarker" may be used to indicate whether the cast expression is a parameter marker. The property "dataType" may be used to indicate the data type to which the cast expression is attempting to cast. The class SQLExpressionGroup 914 has a property called "operatorKind" of type SQLOperatorKind, which was described in conjunction with the description of the class SQLQueryGroup 804. The class SQLFunctionInvocationExpression 912 has a Boolean property called "isSpecialRegister". When the present invention is used in conjunction with DB2 (a relational database management system for large business computers that is marketed by IBM of Armonk, N.Y.), "isSpecialRegister" is used to denote that a particular function invocation does not require parameters.

Figure 10:
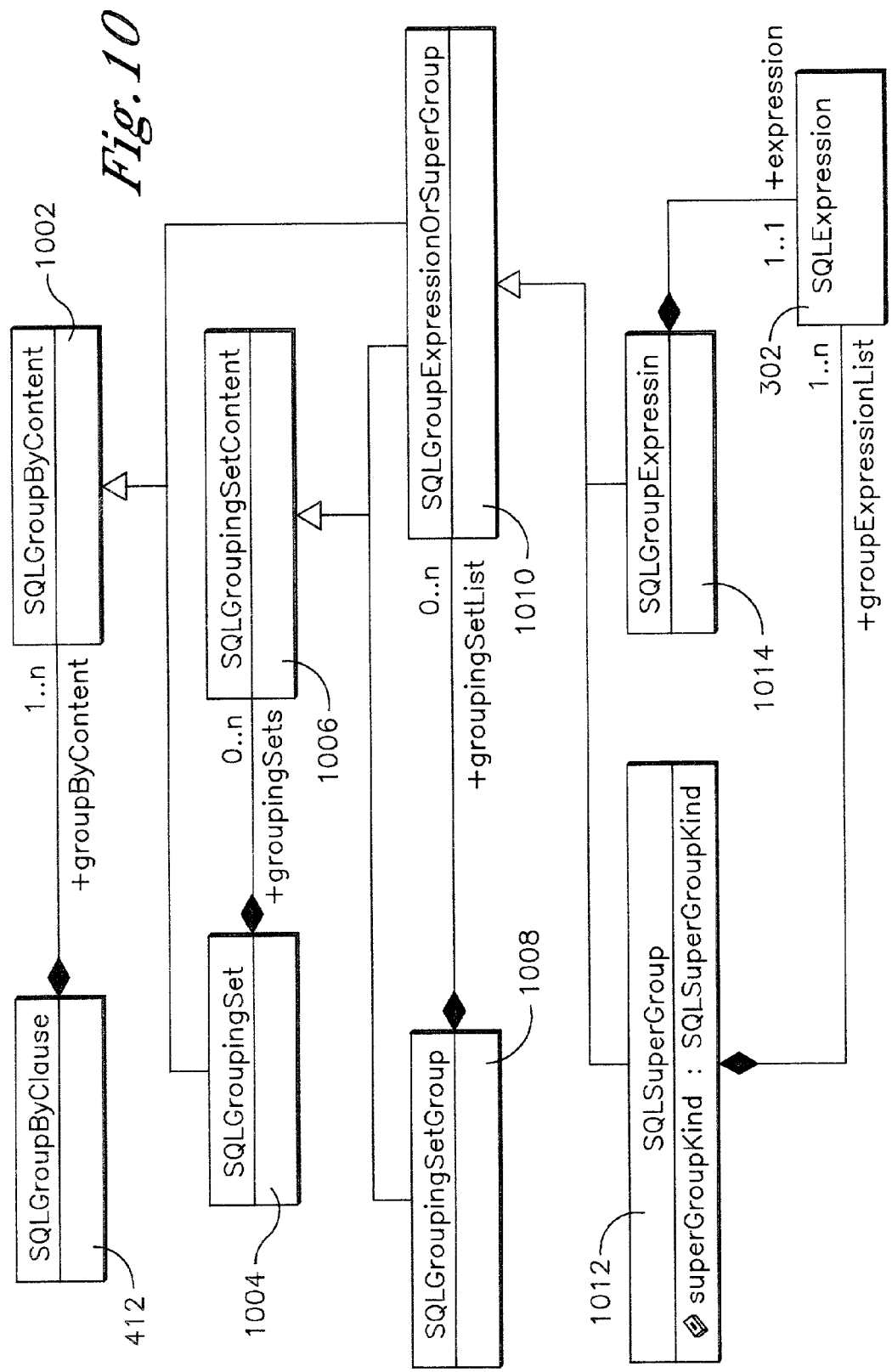
FIG. 10 illustrates a class diagram, of the UML schema for SQL statements that is an embodiment of the present invention, including a class SQLGroupExpression.

The syntax of a GROUP BY clause, which may be seen above, is an optional component of a SELECT statement. A GROUP BY clause is defined by the class SQLGroupByClause 412. As shown in FIG. 10, the class SQLGroupByClause 412 owns an abstract class SQLGroupByContent 1002. A class SQLGroupingSet 1004 is derived from the abstract class SQLGroupByContent 1002 and owns an abstract class SQLGroupingSetContent 1006. Both a class SQLGroupingSetGroup 1008 and an abstract class SQLGroupExpressionOrSuperGroup 1010, which is owned by class the SQLGroupingSetGroup 1008, are derived from the abstract class SQLGroupingSetContent 1006. Meantime, each of a class SQLGroupExpression 1014 and a class SQLSuperGroup 1012 derive from the abstract class SQLGroupExpressionOrSuperGroup 1010 and own the abstract class SQLExpression 302. Note that the class SQLSuperGroup 1012 has a property called "superGroupKind" of type SQLSuperGroupKind. The property "superGroupKind" may be used to indicate whether the super group, which is an instance of the class SQLSuperGroup 1012, is a CUBE grouping or a ROLLUP grouping. As may be determined through a review of the SQL specification, where a ROLLUP grouping is a series of grouping-sets, a CUBE grouping is an extension to the GROUP BY clause that produces a result set that contains all the rows of a ROLLUP grouping and, in addition, contains ?cross-tabulation? rows.

Figure 11:
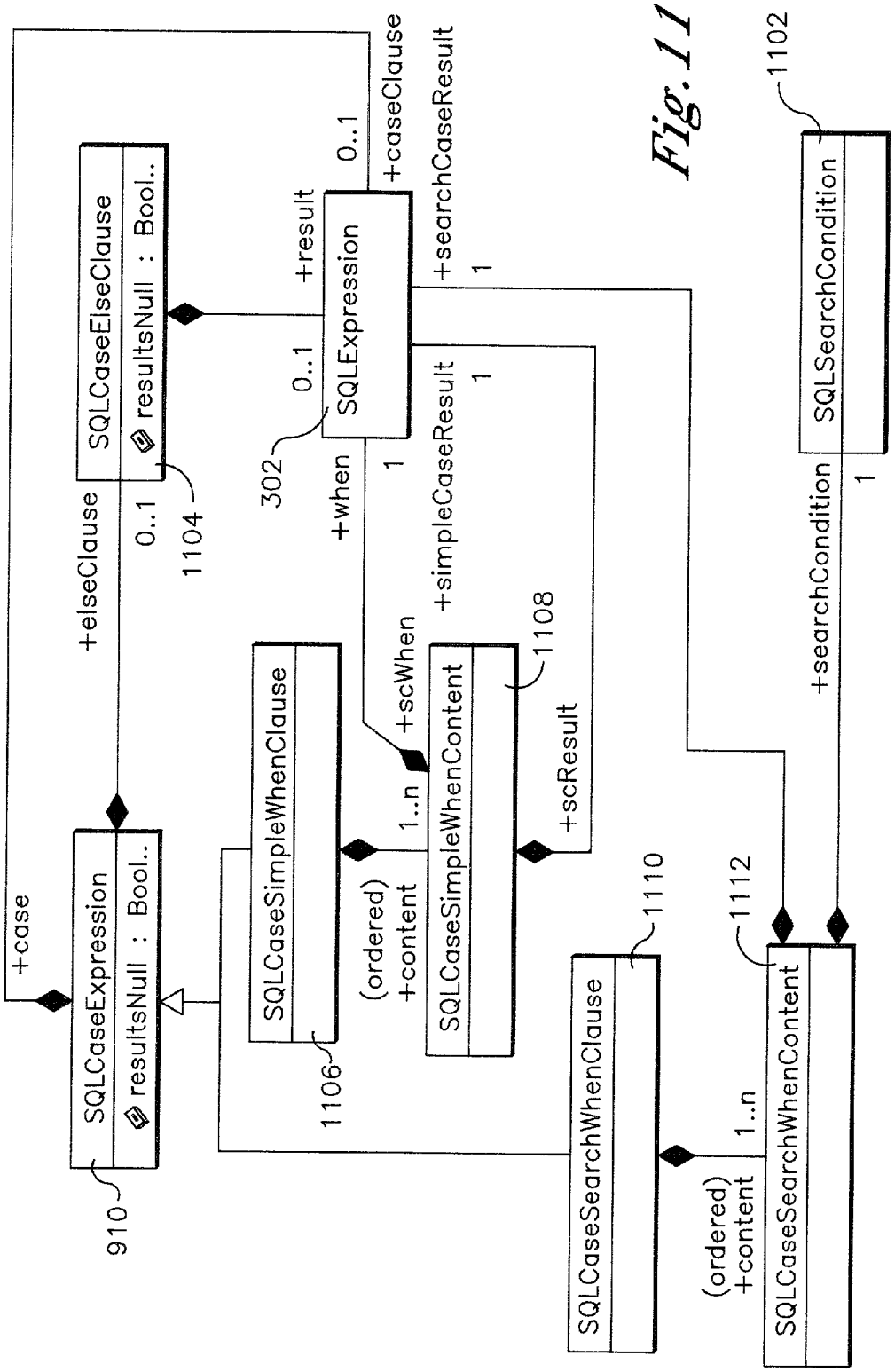
FIG. 11 illustrates a class diagram, of the UML schema for SQL statements that is an embodiment of the present invention, including an abstract class SQLCaseExpression.

A case expression is defined by the abstract class SQLCaseExpression 910. As can be seen in FIG. 11, the abstract class SQLCaseExpression 910 owns the abstract class SQLExpression 302 and a class SQLCaseElseClause 1104, which latter class also owns the abstract class SQLExpression 302. Classes derived from the abstract class SQLCaseExpression 910 include a class SQLCaseSimpleWhenClause 1106 and a class SQLCaseSearchWhenClause 1110. The class SQLCaseSimpleWhenClause 1106 owns a class SQLCaseSimpleWhenContent 1108, which class owns the abstract class SQLExpression 302. The class SQLCaseSearchWhenClause 1110 owns a class SQLCaseSearchWhenContent 1112, which class owns an abstract class SQLSearchCondition 1102 and the abstract class SQLExpression 302.

Figure 12:
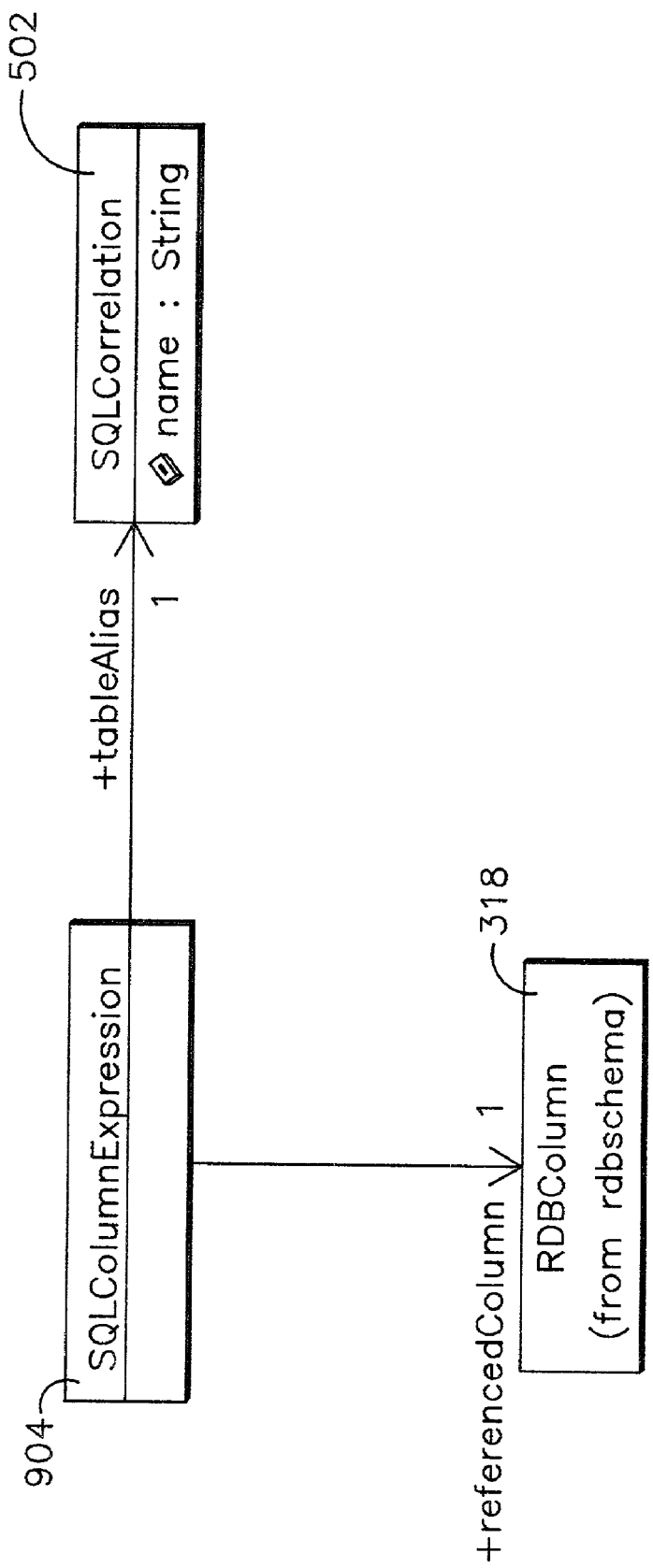
FIG. 12 illustrates a class diagram, of the UML schema for SQL statements that is an embodiment of the present invention, including a class SQLColumnExpression.

A "Column" expression is defined by the class SQLColumnExpression 904. In FIG. 12, the class SQLColumnExpression 904 is illustrated as referencing the class SQLCorrelation 502 and the class RDBColumn 318.

Figure 13:
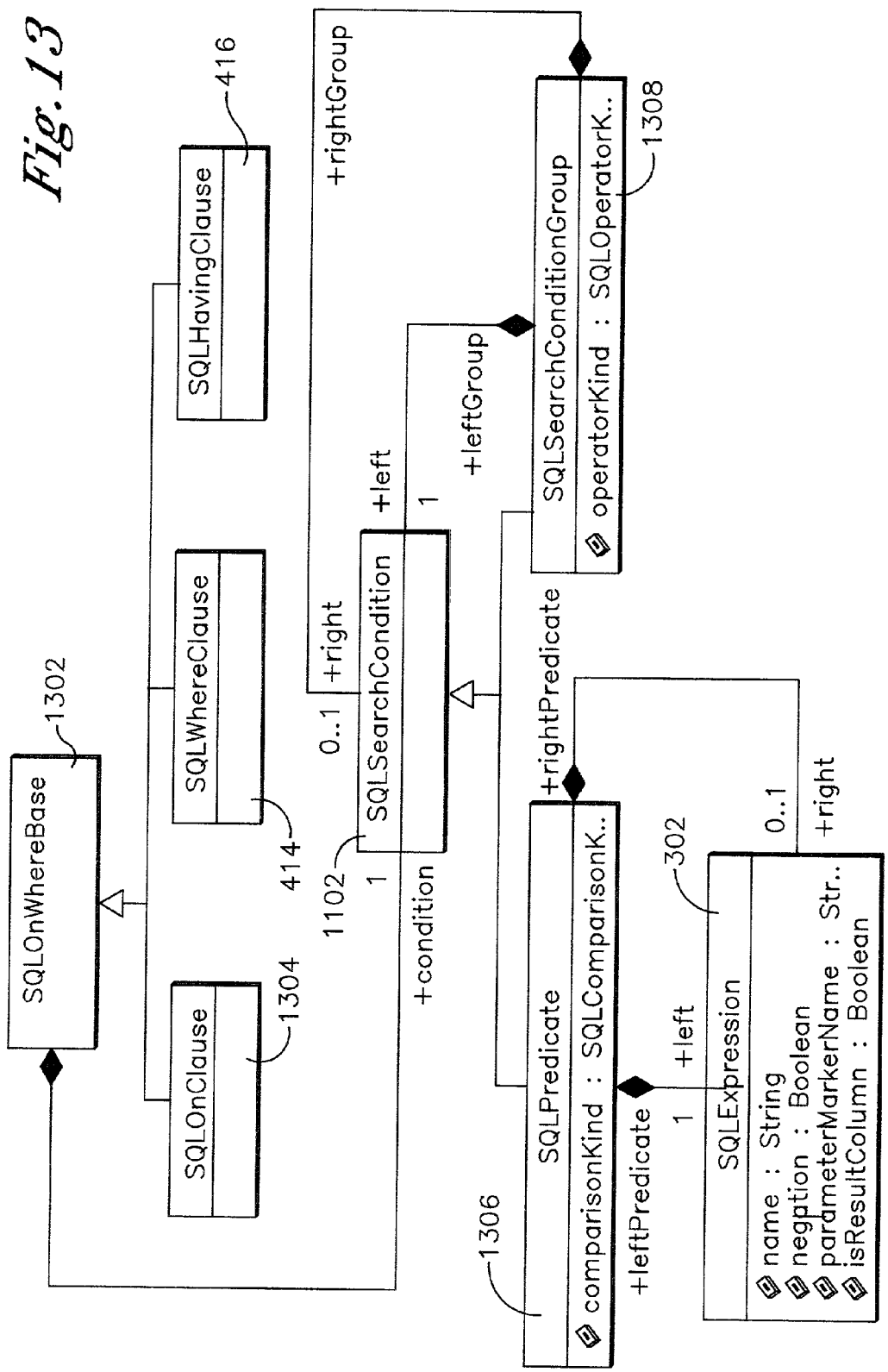
FIG. 13 illustrates a class diagram, of the UML schema for SQL statements that is an embodiment of the present invention, including an abstract class SQLSearchCondition.

As seen in the earlier discussion of the SELECT statement, the argument of a WHERE clause is a search condition. The abstract class SQLSearchCondition 1102, as shown in FIG. 13, is owned by an abstract class SQLOnWhereBase 1302 and a class SQLSearchConditionGroup 1308. The class SQLSearchConditionGroup 1308 is also derived from the abstract class SQLSearchCondition 1102, as is a class SQLPredicate 1306 so derived. The class SQLPredicate 1306 owns the abstract class SQLExpression 302. Additionally, a class SQLOnClause 1304, the class SQLWhereClause 414 and the class SQLHavingClause 416 are derived from the abstract class SQLOnWhereBase 1302. The class SQLPredicate 1306 has a property called "comparisonkind" of type SQLComparisonKind. The property "comparisonkind" may be used to describe the predicate, which is an instance of the class SQLPredicate 1306, used for a given comparison (none, =, <, >, <=, etc.). The class SQLSearchConditionGroup 1308 has a property called "operatorKind" of type SQLOperatorKind, which was described in conjunction with the description of the class SQLQueryGroup 804.

Figure 14:
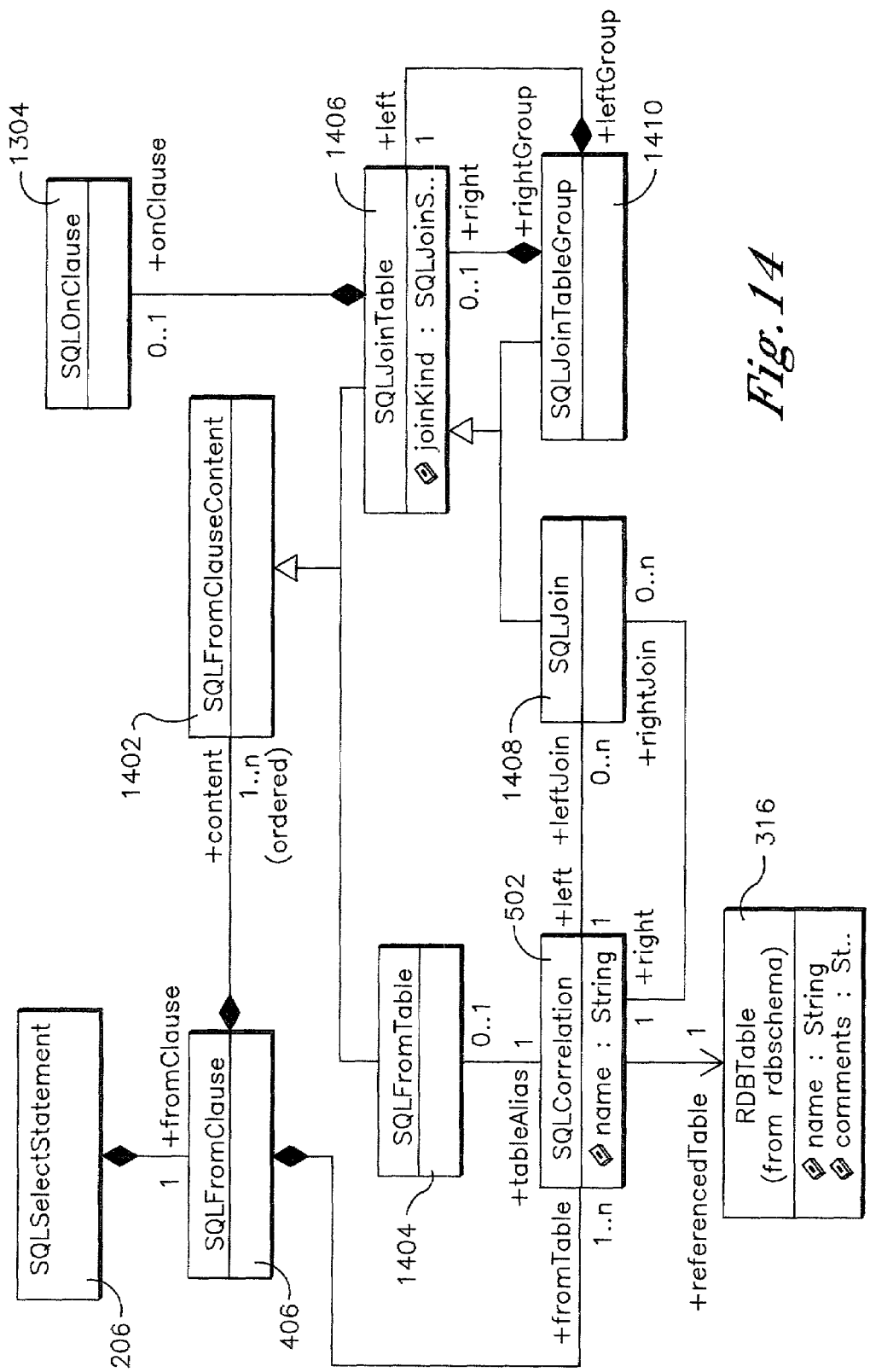
FIG. 14 illustrates a class diagram, of the UML schema for SQL statements that is an embodiment of the present invention, including a class SQLFromClause.

As seen in the earlier discussion of the SELECT statement, the FROM clause is a necessary component of the SELECT statement. As illustrated in FIG. 14, the class, which defines the FROM clause, SQLFromClause 406 is owned by the class SQLSelectStatement 206. Additionally, the class SQLFromClause 406 owns an abstract class SQLFromClauseContent 1402 and the class SQLCorrelation 502. A class SQLFromTable 1404, which references the class SQLCorrelation 502, and an abstract class SQLJoinTable 1406 are derived from the abstract class SQLFromClauseContent 1402. The class SQLCorrelation 502 references the class RDBTable 316 and a class SQLJoin 1408. The class SQLJoin 1408 and a class SQLJoinTableGroup 1410 are both derived from the abstract class SQLJoinTable 1406. The class SQLJoinTableGroup 1410 owns the abstract class SQLJoinTable 1406, which class owns the class SQLOnClause 1304.

A "join" is used to select results from more than one table, based on a common key. The abstract class SQLJoinTable 1406 has a property called "joinKind" of type SQLJoinKind. As will be appreciated, the property "joinKind" indicates a type of join that is involved (inner join, outer join, left outer join, right outer join).

As shown in FIG. 15, a computer system 1502 is in communication with a database 1504. The computer system 1502 may be loaded with database tool software from a software medium 1506 which could be a disk, a tape, a chip or a random access memory containing a file downloaded from a remote source.

In overview, the schema of present invention provides a level of abstraction between a tool, say for querying and updating a database, and the internal representation which the commands, for querying and updating the database, must follow if the commands are to be understood by the database. Once an SQL statement is created by the tool using the schema, information about the statement may be saved to a file as textual SQL. Upon a subsequent startup of the tool, the textual SQL may be parsed to conform with the schema so that the user may continue to use the tool to modify the statement. Alternatively, the schema may be used to provide a representation of a given SQL statement that can be stored to a file in the XMI format (described hereinafter). From the XMI file, the representation of the given SQL statement may be re-created. The user may then modify the re-created representation of the given SQL statement. Advantageously, the vendor of the tool need not be aware of the internal representation of commands specific to the database.

The XML Meta data Interchange (XMI) format is a proposed use of the Extensible Markup Language (XML) that is intended to provide a standard way for programmers and other users to exchange information about meta data (essentially, information about what a set of data consists of and how it is organized). Specifically, the XMI format is intended to help programmers using the UML with different languages and development tools to exchange their data models with each other. In addition, the XMI format can also be used to exchange information about data warehouses. Effectively, the XMI format standardizes how any set of meta data is described and requires users across many industries and operating environments to see data the same way. The XMI format is a proposal from the Object Management Group (OMG) that builds on and extends these industry standards or recommendations: XML; UML; and Meta Object Facility (MOF), which is another standard from the OMG for a metamodeling and meta data repository.

In operation, in a situation wherein the meta data of the database 1504 is stored according to the UML schema called rdbschema 104 (FIG. 1), a user of a tool on the computer system 1502 may formulate an SQL command to query or update the database 1504. Using the tool, the user first opens the database 1504. As a result of opening the database 1504, the tool may present the user, through a graphical user interface (GUI), with a view of top level tables in the database 1504. This view can give the user an idea of the type of information contained in the database 1504. The user can then select a table and choose to create a statement, through the use of menu options presented by the tool GUI, to formulate a command to query or update the selected table.

Referencing FIG. 14 along with FIG. 15, if, for instance, the user indicates, to the tool, a desire to create a SELECT statement, the tool instantiates an object of the class SQLSelectStatement 206 to represent the statement in the schema. The user can then drag and drop a table object, representative, for example, of a table called EMPLOYEES, from one view (of tables in the database 1504) into the GUI of the tool. When this happens, an object of the class SQLFromClause 406 is instantiated (if none existed) and set on the object of the class SQLSelectStatement 206. An object of the class SQLCorrelation 502, which contains the information about the table EMPLOYEES, is created by the tool and added to the object of the class SQLFromClause 406 (as the content to the object of the class SQLFromClause 406). The created SQL statement now appears as:

SELECT*
FROM EMPLOYEES

Referencing FIGS. 4 and 9, if the user wishes to see only one column, say, surname, from the table EMPLOYEES, this desire is indicated to the tool (via the act of selecting the column in the view of the table object), an object of the class SQLColumnExpression 904 is created representing the chosen column and then added as a "resultColumn" to the object of the class SQLSelectClause 402. Note that if an object of the class SQLSelectClause 402 for the object of the class SQLSelectStatement 206 had not already existed, the tool would have created a new object of the class SQLSelectClause 402 for use in the selectclause relationship with the object of the class SQLSelectStatement 206. The created SQL statement now appears as:

SELECT surname
FROM EMPLOYEES

The result table of such a SELECT statement would consist of a column of values, namely all surnames of the EMPLOYEES table.

As will be apparent to a person skilled in the art, further refinements, such as ordering the rows (say, by years of service), grouping the rows (say, by management level) and limiting the result table to rows that satisfy certain criteria (say, to those surnames beginning with "C"), all happen in a similar fashion.

Once the SQL statement has been created, the user may indicate a desire to execute the statement. The tool may then, through a mapping of SQL statements to commands understood by a database of interest, generate a database-specific command and execute the database-specific command to give a result table based on the contents of the database of interest.

By creating a common query model, or schema, as described above, different tools can be implemented to provide value-add functions on top of this common model. This invention allows any tools that are interested in querying meta data to work off a higher abstraction model than is the norm.

The above schema for Structured Query Language (SQL) statements may be implemented in an object-oriented programming language such as Java or C++.

As will be appreciated by those skilled in the art, modifications to the above-described embodiment can be made without departing from the essence of the invention. For example, a schema for SQL statements is expressed above in the form of a Unified Modeling Language (UML) schema, but need not necessarily be expressed in the UML. Other notations, such as the Rumbaugh Object Modeling Technique or Booch notation, may be used to express the schema.

Other modifications will be apparent to those skilled in the art and, therefore, the invention is defined in the claims.

We claim:

1. A computer system implementing a schema for Structured Query Language (SQL) statements comprising:
   an abstract class for describing an SQL expression, said abstract class including:
   a property for indicating a parameter marker name for said SQL expression; and
   a property for indicating whether an expression representing a result column is to be displayed as part of a result table, wherein said abstract class for describing an SQL expression is a first abstract class, further comprising a second abstract class for describing a SQL case expression, where said second abstract class is derived from said first abstract class, the system using the schema to response to a query.

2. The computer system of claim 1, further comprising a class, derived from said second abstract class, for describing a WHEN clause in a case expression.

3. The computer system of claim 2, wherein said WHEN clause is a simple WHEN clause.

4. The computer system of claim 2, wherein said WHEN clause is a search WHEN clause.

5. The computer system of claim 1, further comprising a property for indicating a name for said SQL expression.

6. The computer system of claim 1, wherein said schema is described using the Unified Modeling Language.

7. The computer system of claim 1, further comprising:
   a third abstract class for describing content of an SQL FROM clause; and
   a fourth abstract class for describing a Join between at least two tables, where said fourth abstract class is derived from said third abstract class and said fourth abstract class includes a property for indicating a type for said join.

8. A computer-usable tool for querying and updating a database including means for generating a Structured Query Language query command, where said query command is based on an implementation of the schema of claim 1.

9. A computer medium embodying an object-oriented description of Structured Query Language (SQL) statement, the description comprising:
   an instance of a class derived from an abstract class for describing an SQL expression, said abstract class including:
   a property for indicating a parameter marker name for said SQL expression; and
   a property for indicating whether an expression representing a result column is to be displayed as part of a result tablet, wherein said abstract class for describing an SQL expression is a first abstract class, further comprising a second abstract class for describing a SQL case expression, where said second abstract class is derived from said first abstract class, the classes being usable to respond to a request for information.

10. A computer-implemented method for Structured Query Language (SQL) statements, comprising:
providing an abstract class for describing an SQL expression, said abstract class including:
a property for indicating a parameter marker name for said SQL expression; and
a property for indicating whether an expression representing a result column is to be displayed as part of a result tablet, wherein said abstract class for describing an SQL expression is a first abstract class, further comprising a second abstract class for describing a SQL case expression, where said second abstract class is derived from said first abstract class; and
using at least one of the abstract classes to generate at least one query result.

11. A computer system embodying a schema, for Structured Query Language (SQL) statements comprising:
a first abstract class for describing content of an SQL FROM clause; and
a second abstract class for describing a join between at least two tables, where said second abstract class is derived from said first abstract class and said second abstract class includes a property for indicating a type for said join, the computer system using the schema to respond to a query.

12. A computer system containing an object-oriented description of a Structured Query Language statement comprising:
a first abstract class for describing content of an SQL FROM clause; and
a second abstract class for describing a join between at least two tables, where said second abstract class is derived from said first abstract class and said second abstract class includes a property for indicating a type for said join, the computer system using at least one of the classes to return a query result.

13. A tool for querying and updating a database including means for generating a Structured Query Language query command, where said query command is based on an implementation of the schema of claim 11.

14. A computer executing an object-oriented programming language implementation of a schema for Structured Query Language (SQL) statements, said schema comprising:
a first abstract class for describing content of an SQL FROM clause; and
a second abstract class for describing a join between at least two tables, where said second abstract class is derived from said first abstract class said second abstract class includes a property for indicating a type for said join, the computer implementing the schema to return at least one query result.

15. A computer-implemented method of generating a representation of a Structured Query Language (SQL) statement comprising:
receiving input from a user, said input specifying a SQL statement and a database upon which said SQL statement is to act;
responsive to said receiving said input, creating a representation of said SQL statement, where said creating includes instantiating an object of a class derived from an abstract class for describing an SQL expression, said abstract class including:
a property for indicating a parameter marker name for said SQL expression; and
a property for indicating whether an expression representing a result column is to be displayed as part of a result table; and
using the representation to return a response to a query, wherein said abstract class for describing an SQL expression is a first abstract class, further comprising a second abstract class for describing a SQL case expression, where said second abstract class is derived from said first abstract class.

16. The method of claim 14, comprising storing said representation in textual format.

17. The method of 14 comprising storing said representation in an Extensible Markup Language Meta data Interchange format.

18. A computer executing logic to:
receive input from a user, said input specifying a SQL statement and a database upon which said SQL statement is to act;
responsive to said receiving said input, creating a representation of said SQL statement, where said creating includes instantiating an object of a class derived from an abstract class for describing an SQL expression, said abstract class including:
a property for indicating a parameter marker name for said SQL expression; and
a property for indicating whether an expression representing a result column is to be displayed as part of a result table; and
store said representation of said SQL statement, wherein said abstract class is a first abstract class, further comprising a second abstract class for describing a SQL case expression, where said second abstract class is derived from said first abstract class.

* * * * *